US00RE37321B1

(19) United States
(12) Reissued Patent
Poltielov

(10) Patent Number: US RE37,321 E
(45) Date of Reissued Patent: Aug. 14, 2001

(54) SYSTEM FOR PREPARING BAKED APPLES AND OTHER EDIBLE FRUITS AND VEGETABLES

(76) Inventor: Neris Poltielov, 105-05 69th Ave., Apt. 114, Forest Hills, NY (US) 11375

(21) Appl. No.: 09/465,656

(22) Filed: Dec. 16, 1999

Related U.S. Patent Documents

Reissue of:
(64) Patent No.: 5,699,725
Issued: Dec. 23, 1997
Appl. No.: 08/650,177
Filed: May 20, 1996

(51) Int. Cl.[7] ..... A23N 3/00
(52) U.S. Cl. ..... 99/494; 99/542; 99/544; 99/547
(58) Field of Search ..... 99/494, 542–545, 99/588, 547–565, 635, 636; 426/481–485, 523

(56) References Cited

U.S. PATENT DOCUMENTS

| | | | | |
|---|---|---|---|---|
| 1,568,008 | * | 12/1925 | Thomas | 99/562 X |
| 3,586,081 | * | 6/1971 | Loveland et al. | 99/542 |
| 3,610,303 | * | 10/1971 | Loveland et al. | 99/542 |
| 3,656,527 | * | 4/1972 | Vadas et al. | 426/482 |
| 3,738,257 | * | 6/1973 | Manfre et al. | 99/547 |
| 3,869,974 | * | 3/1975 | Elllis | 99/547 |
| 3,962,963 | * | 6/1976 | Ellis | 99/544 |
| 4,426,924 | * | 1/1984 | Culwell | 99/545 |
| 4,609,110 | * | 9/1986 | Schulman et al. | 426/484 X |
| 4,831,923 | * | 5/1989 | Ek | 99/494 |
| 5,056,223 | * | 10/1991 | Buck et al. | 99/544 |
| 5,481,803 | * | 1/1996 | Guthrie et al. | 99/588 X |
| 5,557,998 | * | 9/1996 | Schwartz et al. | 99/544 X |
| 5,590,591 | * | 1/1997 | Kim | 99/635 X |

* cited by examiner

*Primary Examiner*—Timothy F. Simone
(74) *Attorney, Agent, or Firm*—Notaro & Michalos P.C.

(57) ABSTRACT

A system for preparing baked applies (12) and other edible fruits and vegetables which comprises a component for coring through a top of an apple (16) and into a core (18) thereof to remove the core (18) with its seeds, so as to form a hole (20) therein. A facility (22) is for removing some pulp (24) of the apple (16) from within the hole (20), so as to form an expanded chamber (26) therein with a top inlet port (28). A prepared sweet food mass filler (30) can be inserted past the top inlet port (28) and into the expanded chamber (26), a food topping (32) placed thereon and the apple (16) baked.

31 Claims, 6 Drawing Sheets

SYSTEM FOR PREPARING BAKED APPLES AND OTHER EDIBLE FRUITS AND VEGETABLES

Matter enclosed in heavy brackets [ ] appears in the original patent but forms no part of this reissue specification; matter printed in italics indicates the additions made by reissue.

BACKGROUND OF THE INVENTION

1. Field of the Invention

The instant invention relates generally to processed food devices and more specifically it relates to a system for preparing baked apples and other edible fruits and vegetables.

2. Description of the Prior Art

Numerous processed food devices have been provided in prior art that are adapted to be utilized in preparing various types of processed foods. While these units may be suitable for the particular purpose to which they address they would not be as suitable for the purposes of the present invention as heretofore described.

SUMMARY OF THE INVENTION

A primary object of the present invention is to provide a system for preparing baked apples and other edible fruits and vegetables that will overcome the shortcomings of the prior art devices.

Another object is to provide a system for preparing baked apples and other edible fruits and vegetables, in which a hand-held coring instrument will remove through a top of an apple its care, so that a hole will be formed in the apple.

An additional object is to provide a system for preparing baked apples and other edible fruits and vegetables, in which a rasp bit of a hand-held rotary power tool will enlarge the hole in the apple, to form an expanded chamber, so that it can be filled with a food mass filler before baking.

A further object is to provide a system for preparing baked apples and other edible fruits and vegetables that is simple and easy to use.

A still further object is to provide a system for preparing baked apples and other edible fruits and vegetables that is economical in cost to manufacture.

Further objects of the invention will appear as the description proceeds.

To the accomplishment of the above and related objects, this invention may be embodied in the form illustrated in the accompanying drawings, attention being called to the fact however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
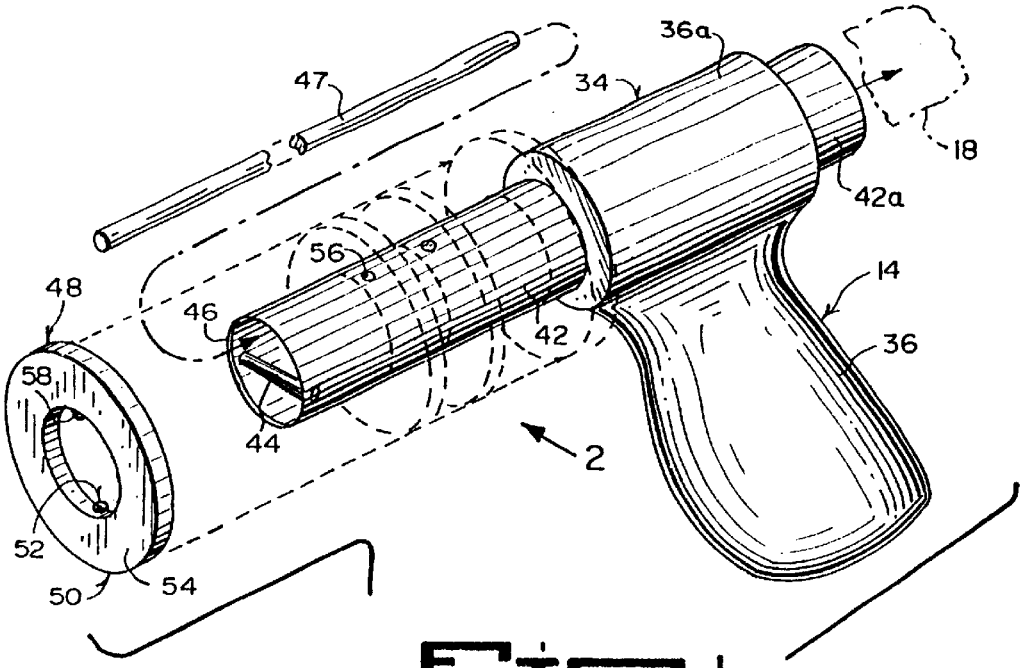
FIG. 1 is a top perspective view of a hand-held coring instrument with its depth setting indicator exploded therefrom.

Turning now descriptively to the drawings, in which similar reference characters denote similar elements throughout the several views, FIGS. 1 through 11 illustrate a system for preparing a baked apple 12 which comprises a component 14 for coring through a top of an apple 16 and into a core 18 thereof to remove the core 18 with its seeds, so as to form a hole 20 therein. A facility 22 is for removing some pulp 24 of the apple 16 from within the hole 20, so as to form an expanded chamber 26 therein with a top inlet port 28. A prepared sweet food mass filler 30 can be inserted past the top inlet port 28 and into the expanded chamber 26, a food topping 32 placed thereon and the apple 16 baked.

Figure 2:
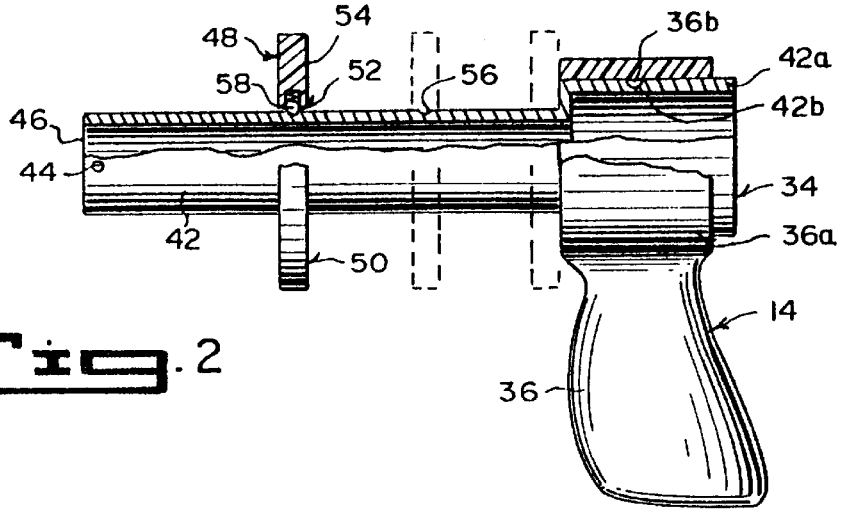
FIG. 2 is a side view taken in the direction of arrow 2 in FIG. 1, with parts broken away and in section with the depth setting indicator therein.
Figure 2A:
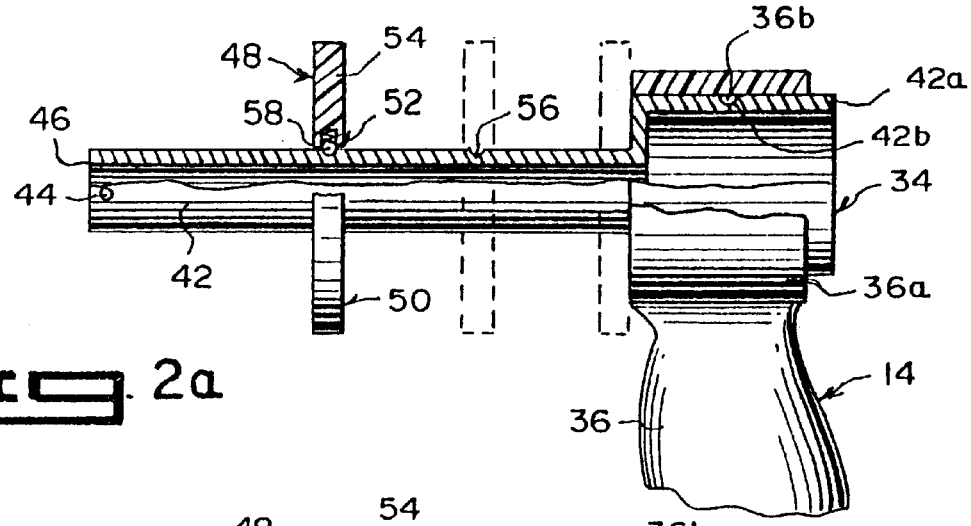
FIG. 2a is a side view similar to FIG. 2, showing a medium size plug cutter barrel.
Figure 3:
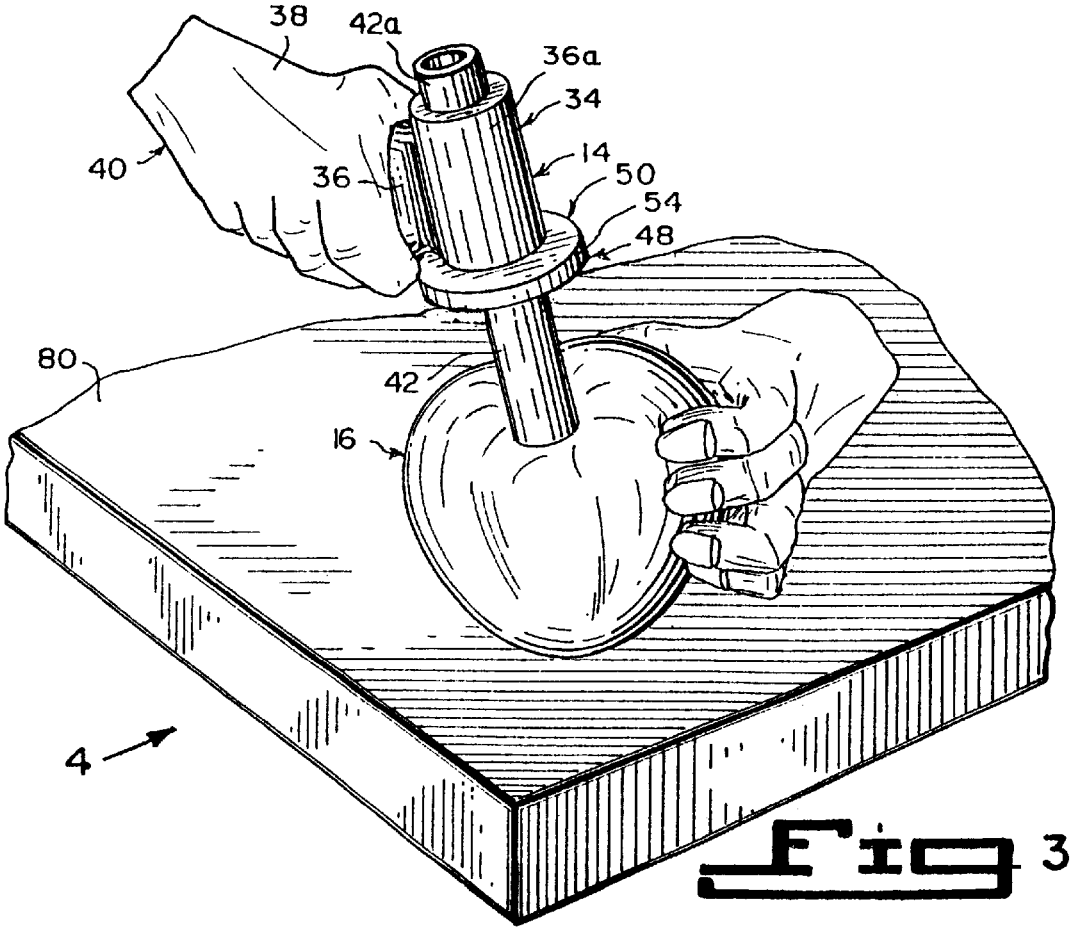
FIG. 3 is a top perspective view, showing the hand-held coring instrument ready to be used in coring an apple.
Figure 4:
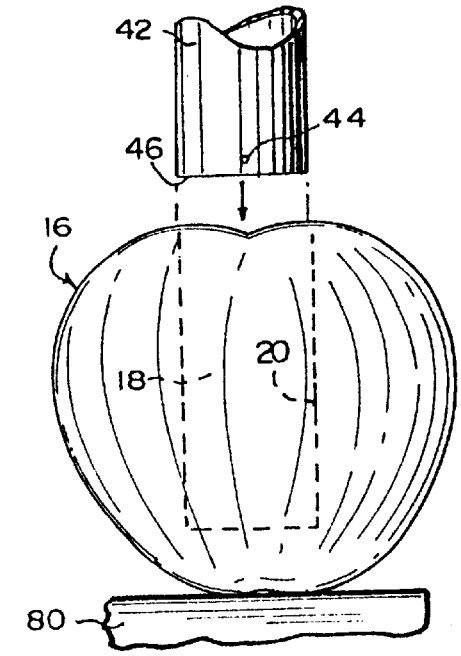
FIG. 4 is an elevational view taken in the direction of arrow 4 in FIG. 3, showing the core ready to be removed from the apple by the plug cutter barrel which is broken away from the hand-held coring instrument.

The coring component 14, as best seen in FIGS. 1 to 3, is a hand-held coring instrument 34. The hand-held coring instrument 14 includes a handle 36 to be grasped by a hand 38 of a person 40. A hollow plug cutter barrel 42 extends at a right angle from the handle 36. A crossbar 44 is at a distal end 46 of the barrel 42. When the barrel 42 is pressed through the top of the apple 16 into the core 18 thereof and turned, the crossbar 44 will dislodge the core 18, allowing the core 18 within the barrel 42 to be removed from the apple 16.

Figure 2B:
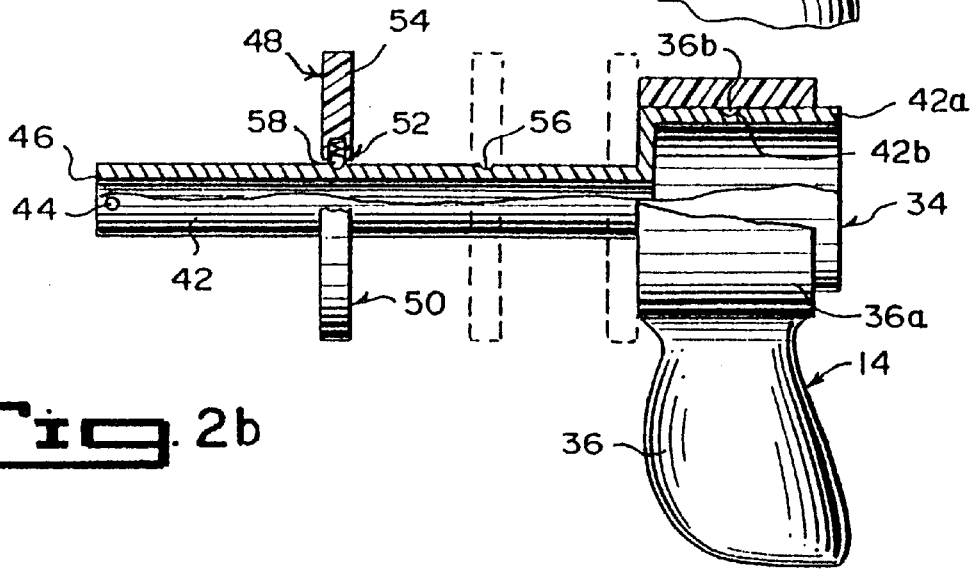
FIG. 2b is a side view similar to FIG. 2, showing a narrow sized plug cutter barrel.

A pusher 47 being an elongated rod, as shown in FIG. 1, can be inserted into the distal end 46 of the barrel to push the core 18 out of the back end 42a of the barrel 42. The barrel 42 can be made in different diameters, as shown in FIGS. 2 to 2b, so as to be used on different sized apples 16. The back end 42a of the barrel 42 has a depression 42b that can be retained within a sleeve 36a of the handle 36 in a removable manner by a projection 36b in the sleeve 36a engaging with the depression 42b.

The hand-held coring instrument 34 further includes a structure 48 for limiting the distance of barrel 42 can be pressed through the top of the apple 16, when the core 18 is to be removed therefrom. The distance limiting structure 48 consists of a depth setting indicator 50. An assemblage 52 is for retaining the indicator 50 on the barrel 42 in a releasing manner.

The depth setting indicator 50 is a washer shaped disc 54, which slides upon do barrel of the hand-held coring instrument 34. The retaining assemblage 52 comprises the barrel 42 having a plurality of spaced apart opposite paired indents 56 therealong. Opposite paired spring biased balls 58 are cost in to washer shaped disc 54. When the washer shaped disc 54 is manually moved along the barrel 42, the spring biased balls 58 will engage with any of the paired indents 56 on the barrel 42.

Figure 5:
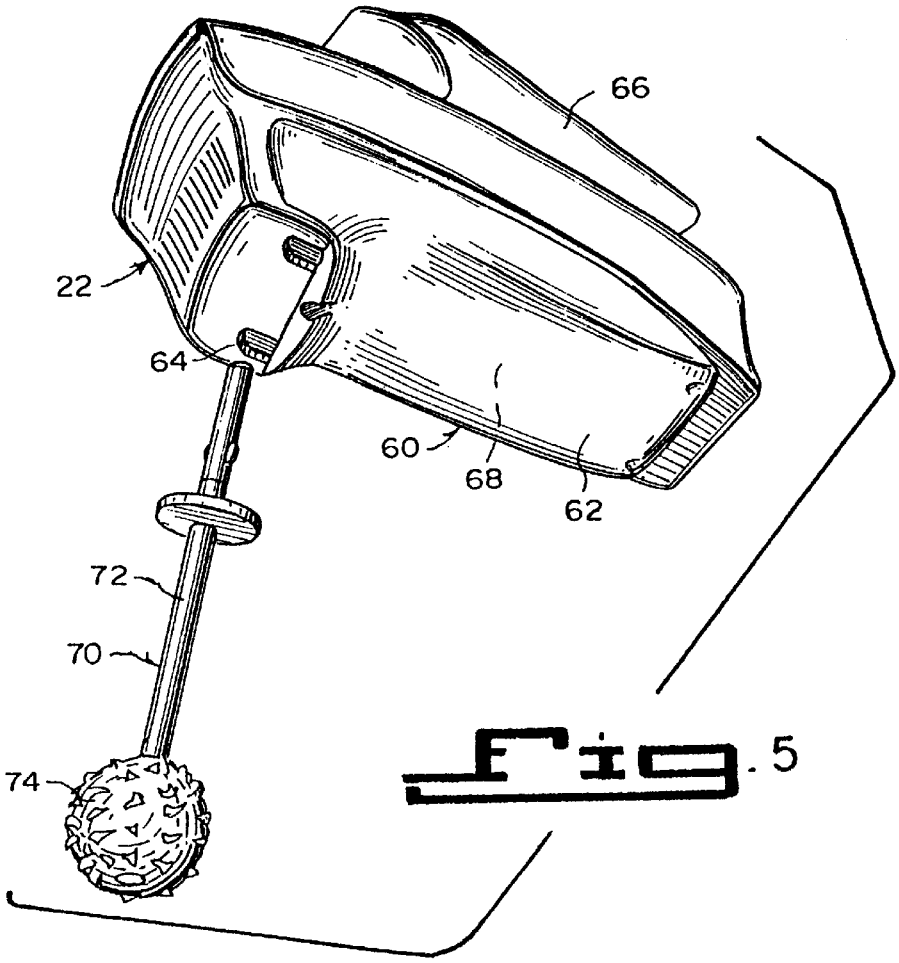
FIG. 5 is a bottom perspective view of a hand-held rotary power tool, showing a rasp bit ready to be inserted into a socket of the tool.

The pulp removing facility 22, as best seen in FIG. 5, is a hand-held rotary power tool 60. The hand-held rotary power tool 60 includes a housing 62 having a socket 64 and a handle 66 to be grasped by a hand of a person. An electric motor 68 is carried within the housing 62. A rasp bit 70 has a shank 72 that can be inserted into the socket 64 of the housing 62. The electric motor 68 am rotate the shank 72 to allow the rasp bit 70 to remove the pulp 24 of the apple 16, when the rasp bit 70 is placed within the hole 20 in the apple 16.

Figure 6:
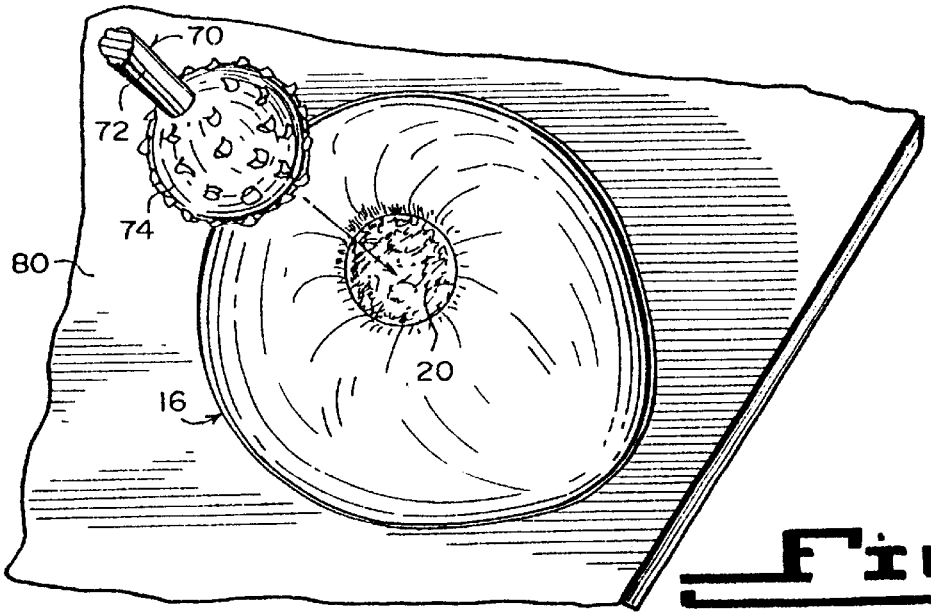
FIG. 6 is a top perspective view of the cored apple ready to receive the rasp bit to form an expanded chamber therein.
Figure 7:
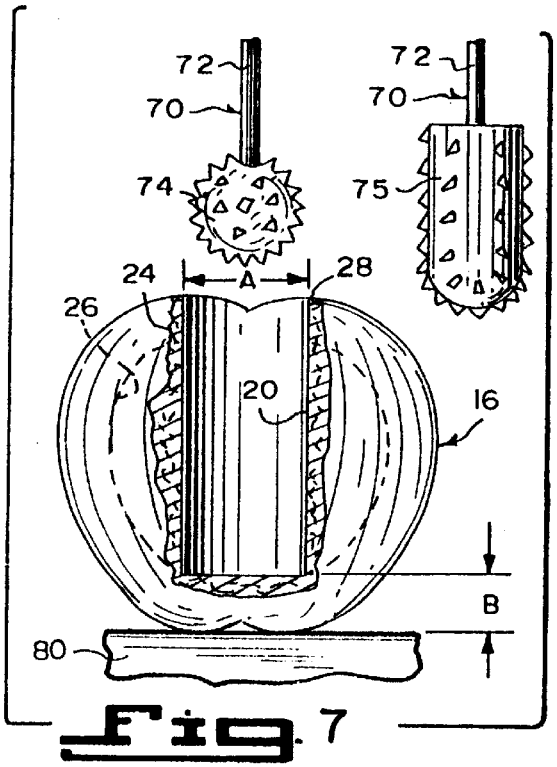
FIG. 7 is an elevational view of the cored apple with parts broken away and in section, showing two types of rasp bits, which can be used to form the expanded chamber within the apple.

The rasp bit 70 can contains a bell-shaped head 74 on a distal end of the shank 72 as shown in FIGS. 5, 6 and 7. The rasp bit 70 can also contain a dome-shaped head 75 on a distal end of the shank 72, as shown in FIG. 7.

The diameter A of the hole 20 is approximately thirty to forty millimeters wide. The distance B of the bottom of the hole 20 is approximately twenty five to thirty millimeters from the base of the apple 16. A wall thickness C of the pulp 24 about the expanded chamber 26 is approximately ten to fifteen millimeters The sizes of diameter A, distance B and wall thickness C can vary depending upon the size of the apple 16.

Figure 8:
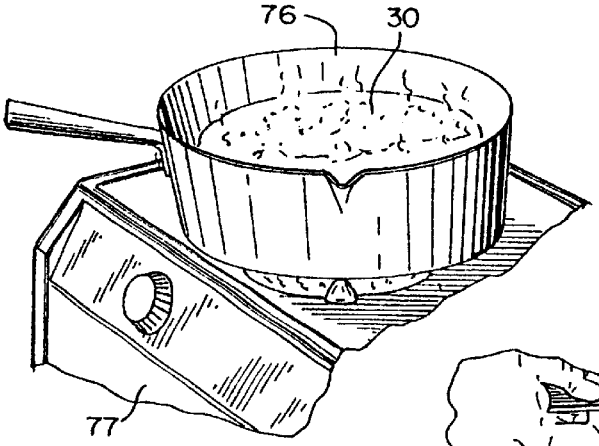
FIG. 8 is a perspective view showing a prepared sweet food mass filler being boiled in a pot on a stove.
Figure 9:
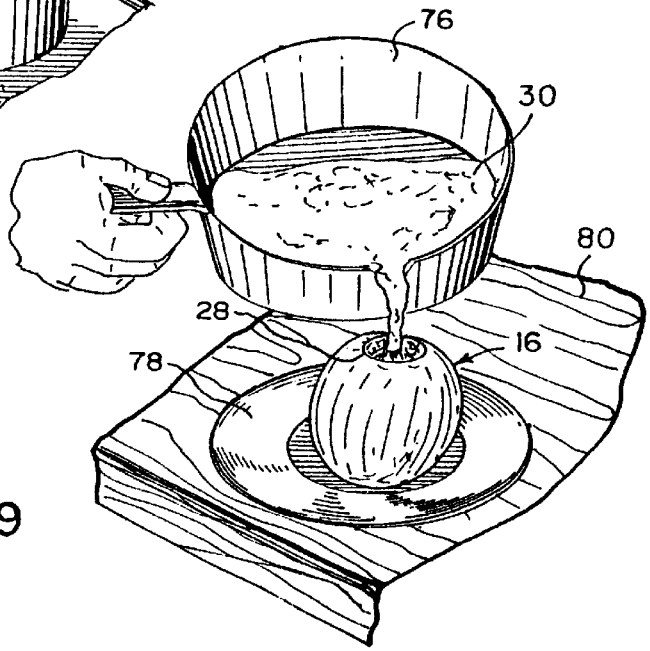
FIG. 9 is a perspective view showing the boiled prepared sweet food mass filler being poured into a top inlet port of the expanded chamber within the apple before baking.
Figure 10:
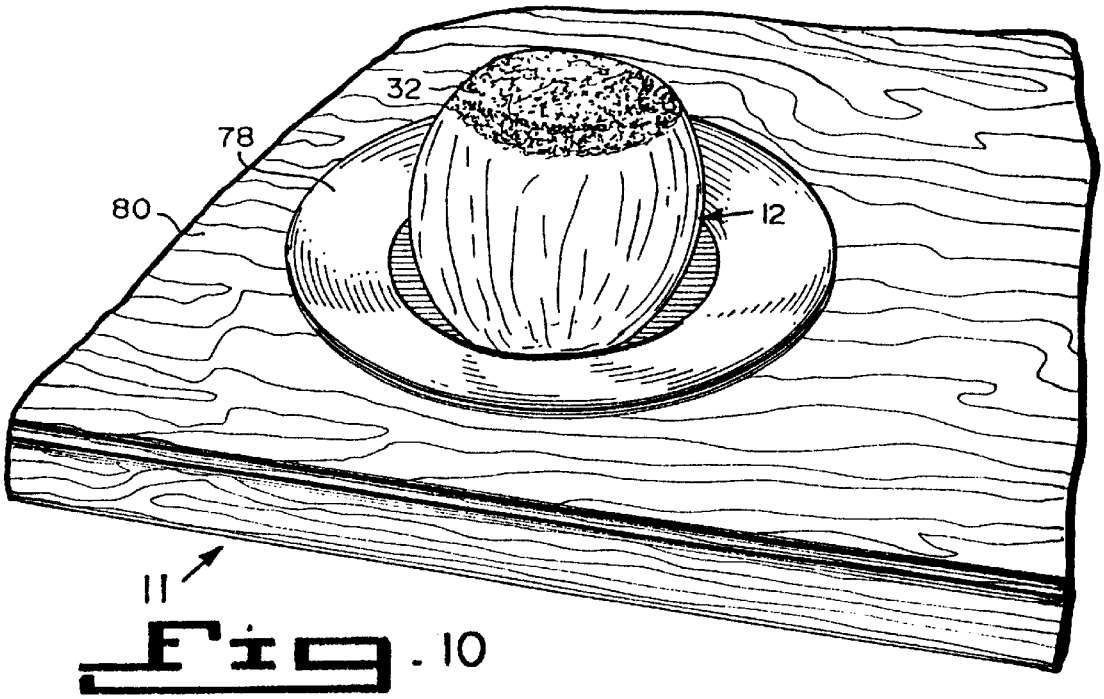
FIG. 10 is a perspective view, showing the apple sitting on a plate after baking.
Figure 11:
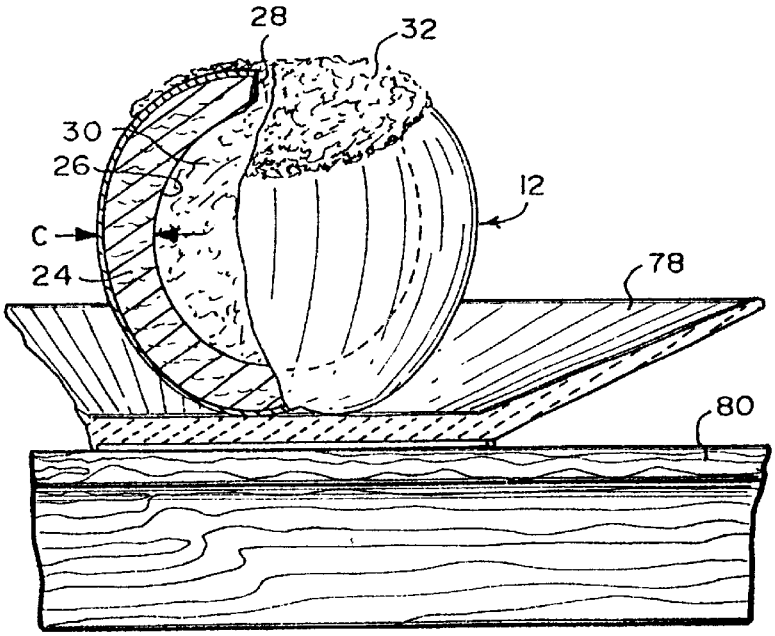
FIG. 11 is an elevational view taken in the direction of arrow 11 in FIG. 10, with parts broken away and in section Similar reference characters denote corresponding features consistently throughout the attached drawings.

The sweet food mass filler 30 consists of one hundred grams of rice, one glass of milk or water, ninety to one hundred grams of sugar, two tablespoons of butter, one raw egg, fifty grams of raisins and fifty grams of walnuts, which are mixed and boiled together in a pot 76 on a stove 77 to became a soft pourable mass that is usable for ten baked apples 12 (see FIG. 8).

The sweet food mass filler 30 can also contain two hundred and fifty to three hundred grams of jelly selected from the group of seedless fruits consisting of strawberries, blueberries and raspberries, one hundred grams of bread or cookie crumbs and one hundred grams of chopped walnuts or almonds, which are mixed together and not boiled, that is usable for ten baked applies 12. The food topping 32 am be a fruit jelly. The food toping 32 can also be chocolate or colored candy sprinkles.

Other hard fruits and vegetable can be used, such as pears, quinces and potatoes in place of the apple 16 as described above. They could be cored out in the same way and filled with meat rice and other food filler ingredients, that are not necessarily sweet.

Further examples of food fillers for ten baked apples 12 are as follows, but not limited to:

1. One hundred and fifty grams of pineapple pie filling or jelly, one cup of bread crumbs or cookie crumbs and seventy five grams of pecans or walnuts.
2. One hundred and fifty grams of raspberry pie filling or jelly, one cup of bread crumbs or cookie crumbs and seventy five grams of peanuts or cashew nuts.
3. One hundred and fifty grams of strawberry, peach apricot or grape pie filling or jelly; one cup of bread crumbs or cookie crumbs and seventy five grams of almonds or Brazil nuts or any other kid of nuts.
4. Sixty five percent of any kind of marmalade with thirty five percent of any kind of nuts.
5. Sixty five percent or any kind of preserves with thirty five percent of any kind of nuts.
6. Seventy percent of farmer cheese, twenty percent of raisins and ten percent of sugar.
7. One hundred percent of any kind of puddings.
8. Thirty five percent of chocolate mixed with sixty five percent of cream cheese.
9. One hundred and fifty gram of honey, one cup of bread crumbs and seventy five grams of walnuts.
10. One hundred percent of chocolate cheese.
11. One hundred percent of any Other type of cheeses.

OPERATION OF THE INVENTION

To prepare the baked apple 12, the following steps should be taken:

1. Core the apple 16 with the hand-held coring instrument 34, so as to form the hole 20 therein.
2. Remove some pulp 24 of be apple 16 from within the hole 20 with the hand-held rotary power tool 60, so as to form the expanded chamber 26 therein with the top inlet port 28.
3. Prepare the sweet food mass filler 30.
4. Insert the sweet food mass filler 30 through the top inlet port 28 and into the expanded chamber 26 within the apple 16.
5. Place the apple 16 with the sweet food mass filler 30 onto a heat resistant plate 78.
6. Add a small amount of water into the heat resistant plate 78.
7. Put the heat resistant plate 78 and the apple 16 with the sweet food mass filler 30 into an electric, gas or microwave oven.
8. Set the temperature of the oven between three hundred and fifty to four hundred degrees Fahrenheit.
9. Bake the apple 16 with the sweet food mass filler 30 until the apple 16 becomes soft.
10. Remove the heat resistant plate 78 and the baked apple 12 with the sweet food mass filler 30 from the oven.
11. Position the beat resistant plate 78 and the baked apple 12 with the sweet food mass filler 30 onto a counter/table top 80 to cool.
12. Sprinkle the food topping 32 onto the sweet food mass filler 30 in the baked apple 12.

LIST OF REFERENCE NUMBERS

A diameter of 20

B distance between bottom of 20 and base of 16

C wall thickness of 24 about 26

12 baked apple

14 coring component

16 apple

18 core of 16

20 hole in 16

22 pulp removing facility

24 pulp of 16

26 expanded chamber in 16
28 top inlet part in 16
30 sweet food inns filler in 26
32 food topping on 16
34 hand-held coring instrument for 14
36 handle of 34
36*a* sleeve of 36
36*b* projection in 36*a*
38 hand of 40
40 person
42 hollow plug cutter barrel of 34
42*a* back end of 42
42*b* depression on 42*a*
44 crossbar at 46
46 distal end of 42
47 pusher-elongated rod
48 distance limiting structure for 42
50 depth setting indicator of 48
52 retaining assemblage of 48
54 washer shaped disc for 50
56 indent in 42 of 52
58 spring biased ball in 54 of 52
60 hand-held rotary power tool for 22
62 housing of 60
64 socket in 62
66 handle on 62
68 electric motor in 62
70 rasp bit of 60
72 shank of 70
74 ball-shaped head on 72
75 dome-shaped head on 72
76 pot
77 stove
78 heat resistant plate
80 counter/table top It will be understood that each of the elements described above, or two of more, together may also find a useful application in other types of methods differing from the type application described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the stand of prior art, fairly constitute essential characteristics of the generic or specific aspects of this invention.

What is claimed is new and desired to be protected by Letters Patent is set forth in the appended claims:

1. A system for preparing baked apples and other edible fruits and vegetables which comprises:

a) means for coring through a top of an apple and into a core thereof to remove the core with its seeds, so as to form a hole therein; and b) means for removing some pulp of the apple from within the hole, so as to form an expanded chamber therein with a top inlet port, in Which a prepared sweet food mass filler can be inserted past the top inlet port and into the expanded chamber, a food topping placed thereon and the apple baked.

2. A system for preparing baked apples and other edible fruits and vegetables as recited in claim 1, wherein said coring means is a hand-held coring instrument.

3. A system for preparing baked apples and other edible fruits and vegetables as recited in claim 2, wherein said hand-held coring instrument includes:

a) a handle to be grasped by a hand of a person;

b) a hollow plug cutter barrel extending at a right angle from said handle; and c) a crossbar at a distal end of said barrel, so that when said barrel is pressed through the top of the apple into the core thereof and turned, said crossbar will dislodge the core, allowing the core within said barrel to be removed from the apple.

4. A system for preparing baked apples and other edible fruits and vegetables as recited in claim 3, wherein said hand-held coring instrument further includes means for limiting the distance said barrel can be pressed through the top of the apple, when the core is to be removed therefrom.

5. A system for preparing baked apples and other edible fruits and vegetables as recited in claim 4, wherein said distance limiting means includes:

a) a depth setting indicator; and b) means for retaining said indicator on said barrel in a releasing manner.

6. A system for preparing baked apples and other edible fruits and vegetables as recited in claim 5, wherein said depth setting indicator is a washer shaped disc which slides upon said barrel of said hand-held coring instrument.

7. A system for preparing baked apples and other edible fruits and vegetables as recited in claim 6, wherein said retaining means includes:

a) said barrel having a plurality of spaced apart opposite paired indents therealong; and b) opposite paired spring biased bails carried in said washer shaped disc, so that when said washer shaped disc is manually moved along said barrel said spring biased bails will engage With any of said paired indents on said barrel.

8. A system for preparing baked apples and other edible fruits and vegetables as recited in claim 1, wherein said pulp removing means is a hand-held rotary power tool.

9. A system for preparing baked apples and other edible fruits and vegetables as recited in claim 8, wherein said hand-held rotary power tool includes:

a) a housing having a socket and a handle to be grasped by a hand of a person;

b) an electric motor carried within said housing; and c) a rasp bit having a shank that can be inserted into the socket of said housing, so that said electric motor can rotate said shank to allow said rasp bit to remove the pulp a the apple, when said rasp bit is placed within the hole in the apple.

10. A system for preparing baked apple and other edible fruits and vegetables as recited in claim 9, Wherein said rasp bit includes a ball-shaped head on a distal end of said shank.

11. A system for preparing baked apples aid other edible fruits and vegetables as recited in claim 9, wherein said rasp bit includes a dome-shaped head on a distal end of said shank.

12. A system for preparing baked apples and other edible fruits and vegetables which comprises:

a) a hand-held coring instrument to core through a top of an apple and into a core thereof to remove the core with its seeds, so as to form a hole therein; and b) a hand-held rotary power tool to remove some pulp of the apple from within the hole, so as to form an expanded chamber therein with a top inlet port, in which a prepared sweet food mass filler can be inserted past the top inlet port and into the expanded chamber, a food topping placed thereon and the apple baked.

13. A system for preparing baked apples and other edible fruits and vegetables as recited in claim 12, wherein said hand-held coring instrument includes:

a) a handle to be grasped by a hand of a person;

b) a hollow plug cutter barrel extending at a right angle from said handle; and c) a crossbar at a distal end of said barrel, so that when said barrel is pressed through the top of the apple into the core thereof and turned, said crossbar will dislodge the core, allowing the core within said barrel to be removed from the apple.

14. A system for preparing baked apples and other edible fruits and vegetables as recited in claim 13, wherein said hand-held coring instrument further includes means for limiting the distance said barrel can be pressed through the top of the apple, when the core is to be removed therefrom.

15. A system for preparing baked apples and other edible fruits and vegetables as recited in claim 14, wherein said distance limiting means includes:

a) a depth setting indicator; and b) means for retaining said indicator on said barrel in a releasing manner.

16. A system for preparing baked apples and other edible fruits and vegetables as recited in claim 15, wherein said depth setting indicator is a washer shaped disc which slides upon said barrel of said hand-held coring instrument.

17. A system for preparing baked apples and other edible fruits and vegetables as recited in claim 16, wherein said retaining means includes:

a) said barrel having a plurality of spaced apart opposite paired indents therealong; and b) opposite paired spring biased balls carried in said washer shaped disc, so that when said washer shaped disc is manually moved along said barrel said spring biased balls will engage with any of said paired indents on said barrel.

18. A system for preparing baked apples and other edible fruits and vegetables as recited in claim 17, wherein said hand-held rotary power tool includes:

a) a housing having a socket and a handle to be grasped by a hand of a person;

b) an electric motor carried within said housing; and c) a rasp bit having a shank that can be inserted into the socket of said housing, so that said electric motor can rotate said shank to allow said rasp bit to remove the pulp of the apple, when said rasp bit is placed within the hole in the apple.

19. A system for preparing baked apples and other edible fruits and vegetables as recited in claim 18, wherein said rasp bit includes a ball-shaped head on a distal end of said shank.

20. A system for preparing baked apples and other edible fruits and vegetables as recited in claim 19, wherein said rasp bit includes a dome-shaped head on a distal end of said shank.

*21. A hand-held coring instrument for coring fruit or vegetables comprising*

*a) grasping means to be grasped by a hand of a person;*

*b) hollow plug cutter barrel connected to said grasping means; and*

*c) means for adjustably limiting the distance said barrel can be pressed into the fruit or vegetable.*

*22. A hand-held coring instrument for coring fruit or vegetable comprising:*

*a) grasping means to be grasped by a hand of a person;*

*b) hollow plug cutter barrel connected to said grasping means;*

*c) a crossbar at a distal end of said barrel so that when said barrel is pressed into the fruit or vegetable and turned, said crossbar will dislodge a core, allowing the core within said barrel to be removed from the fruit or vegetable; and*

*d)* means for adjustably limiting the distance said barrel can be pressed into the fruit or vegetable.

*23. A hand-held coring instrument as set forth in claim 21, wherein said distance limiting means includes:*

*a) a depth setting indicator; and*

*b) means for retaining said indicator on said barrel in a releasing manner.*

*24. A hand-held coring instrument as set forth in claim 23, wherein said depth setting indicator comprises a cylinder which slides relative to said barrel of said hand-held coring instrument.*

*25. A hand-held coring instrument as set forth in claim 23 wherein said retaining means includes:*

*a) a plurality of spaced apart indents along said barrel; and*

*b) engaging means carried in said cylinder for engaging with any of said indents on said barrel when said cylinder is manually moved along said barrel.*

*26. A hand-held coring instrument as set forth in claim 24, wherein said retaining means includes:*

*a) a plurality of spaced apart indents along said barrel; and*

*b) engaging means carried in said cylinder for engaging with any of said indents on said barrel when said cylinder is manually moved along said barrel.*

*27. A hand-held coring instrument as set forth in claim 23, further comprising means for retaining said grasping means on said barrel in a releasing manner.*

*28. A hand-held coring instrument as set forth in claim 24, further comprising means for retaining said grasping means on said barrel in a releasing manner.*

*29. A hand-held coring instrument as set forth in claim 25, wherein said indents comprise opposite paired indents.*

*30. A hand-held coring instrument as set forth in claim 26, wherein said indents comprise opposite paired indents.*

*31. A hand-held coring instrument as set forth in claim 21 or 22 wherein said hollow plug cutter barrel is detachably connected to said grasping means.*

* * * * *